(12) United States Patent
Adams et al.

(10) Patent No.: US 10,489,455 B2
(45) Date of Patent: Nov. 26, 2019

(54) SCOPED SEARCH ENGINE

(71) Applicant: INTERNATIONAL BUSINESS MACHINES CORPORATION, Armonk, NY (US)

(72) Inventors: Samuel S. Adams, Rutherfordton, NC (US); Igor Arsovski, Williston, VT (US); Suparna Bhattacharya, Bangalore (IN); John M. Cohn, Richmond, VT (US); Gary P. Noble, Worcestershire (GB); Krishnan S. Rengarajan, Bangalore (IN)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 1051 days.

(21) Appl. No.: 14/546,318

(22) Filed: Nov. 18, 2014

(65) Prior Publication Data
US 2016/0140243 A1 May 19, 2016

(51) Int. Cl.
*G06F 16/901* (2019.01)
*G06F 16/2457* (2019.01)
*G06F 16/35* (2019.01)
*G06F 16/9535* (2019.01)

(52) U.S. Cl.
CPC ...... *G06F 16/9024* (2019.01); *G06F 16/2457* (2019.01); *G06F 16/35* (2019.01); *G06F 16/9535* (2019.01)

(58) Field of Classification Search
CPC .......... C06F 17/30867; C06F 17/30522; C06F 17/30705; G06F 16/9535; G06F 16/2457; G06F 16/35

USPC ........................................................ 707/706
See application file for complete search history.

(56) References Cited

U.S. PATENT DOCUMENTS

| 7,065,609 | B2 | 6/2006 | Eatherton et al. |
| 7,219,184 | B2 | 5/2007 | Stojancic |
| 7,349,230 | B2 | 3/2008 | Parthasarathy et al. |
| 7,676,444 | B1 | 3/2010 | Venkatachary et al. |
| 7,788,445 | B2 | 8/2010 | Pani |
| 7,969,758 | B2 | 6/2011 | Raj |
| 8,122,189 | B1 | 2/2012 | Maheshwari |
| 8,731,971 | B1 | 5/2014 | O'Neill et al. |
| 9,269,440 | B2 * | 2/2016 | Arsovski ............... G11C 11/417 |

(Continued)

FOREIGN PATENT DOCUMENTS

| KR | 1020070003488 A | 1/2007 |
| WO | 2011021187 A1 | 2/2011 |

OTHER PUBLICATIONS

Afek, Yehuda et al. "Recursive Design of Hardware Priority Queues." SPAA '13, Jul. 23-25, 2013. pp. 23-32.

(Continued)

*Primary Examiner* — Shahid A Alam
(74) *Attorney, Agent, or Firm* — Anthony Canale; Andrew M. Calderon; Roberts Mlotkowski Safran Cole & Calderon, P.C.

(57) ABSTRACT

A scoped search engine is disclosed. The scoped search engine includes a memory unit storing reference data records. The scoped search engine also includes a data comparison unit that searches the reference data records using different searches. The scoped search engine further includes a match analysis unit that combines result data from the different searches and determines a scope for a subsequent search based on the combined result data.

20 Claims, 11 Drawing Sheets

(56) References Cited

U.S. PATENT DOCUMENTS

| | | | | |
|---|---|---|---|---|
| 2004/0093462 | A1* | 5/2004 | Roth | G11C 15/00 |
| | | | | 711/108 |
| 2011/0264660 | A1* | 10/2011 | Tankovich | G06F 16/24578 |
| | | | | 707/729 |
| 2013/0031077 | A1 | 1/2013 | Liu et al. | |
| 2014/3031704 | * | 10/2014 | Isaacs et al. | G06F 17/30554 |
| | | | | 707/728 |
| 2015/0332767 | A1* | 11/2015 | Arsovski | G11C 11/417 |
| | | | | 365/49.17 |
| 2016/0140243 | A1* | 5/2016 | Adams | G06F 17/30958 |
| | | | | 707/706 |

OTHER PUBLICATIONS

Oh, Eun Chu et al. "Technology Impact Analysis for 3D TCAM." 3D System Integration, 2009. 3DIC 2009. IEEE International Conference on. IEEE, 2009. 5 pages.

Lin, Mingjie et al. "A Low-Power Monolithically Stacked 3D-TCAM." Circuits and Systems, 2008. ISCAS 2008. IEEE International Symposium on. IEEE, 2008. pp. 3318-3321.

Hashmi, Atif et al. "Accelerating Search and Recognition with a TCAM Functional Unit." Computer Design, 2008. ICCD 2008. IEEE International Conference on. IEEE, 2008. pp. 81-86.

* cited by examiner

SCOPED SEARCH ENGINE

FIELD OF INVENTION

This invention relates generally to searching data, and more particularly, to iterative searching of data using scoped searches.

BACKGROUND

Property graphs are emerging as the standard for graph databases. A property graph is a data structure in which data is represented as vertices (i.e., nodes) and edges connecting the vertices. The edges are directional in that they have a source at one vertex and a terminus at another vertex (i.e., each edge has a head and a tail). Both the vertices and the edges can be associated with data representing their properties.

Property graphs are multi-relational in that they include many types of edges that represent different types of relationships between the vertices. More specifically, each of the vertices in a property graph can have a unique identifier, a label, one or more outgoing edges, one or more incoming edges, and one or more properties. Additionally, each of the edges can have a unique identifier, a tail connecting to a first vertex, a head connecting to a second vertex, a label that denotes the type of relationship between its two vertices, and a collection of properties. For example, a first vertex of a property graph labeled "Sam" may be directed to a second vertex labeled "Dave" by an edge labeled "knows." The second vertex (i.e., "Dave") can be directed to a third vertex labeled "Susan" by an edge labeled "teaches." The vertices may have one or more associated properties, such as age, identification number, location, and college. The edge may also have one or more associated properties, such as source and time.

A property graph comprised of many such vertices and edges can be used to determine associations between remote vertices. For example, using a semantic search process, a database query may determine anyone associated with Sam who attends College X (i.e., a name of a particular college or university) defined in the properties by iteratively traversing the property graph from a first vertex (e.g., Sam) to a destination vertex associated with the target of the query (e.g. attend College X).

Content addressable memory (CAM) devices are a special type of memory that search databases at high-speeds by searching multiple records in parallel. A CAM typically includes an array of storage cells arranged in rows and columns, where each row of the CAM array corresponds to a stored word of reference data. The storage cells in a given row couple to a word line and a match line associated with the row. The word line is used to select the row for a read/write operation, while the match line is used to signal a hit (i.e., a match) or a miss during the search operation. Each column of the CAM array corresponds to the same bit position in all of the words. The storage cells in a particular column are coupled to a pair of bit lines and a pair of search-lines associated with the column. During a search operation, the match line develops a logic state that indicates whether the word stored in the row matches a word of search data. The search data is applied to each pair of search lines, which have a pair of complementary binary signals or unique ternary signals thereon that represent a bit of the search data. Each CAM cell changes the voltage on the associated match line if the storage cell stores a bit that does not match the bit represented on the attached search lines. If the voltage on a match line remains unchanged during a search, the word stored in that row of storage cells matches the entire word of search data indicating a hit between the word of reference data and the search data.

SUMMARY

In an aspect of the invention, a scoped search engine comprises a memory unit storing reference data records. The scoped search engine also comprises a data comparison unit that searches the reference data records using different searches. The scoped search engine further comprises a match analysis unit that combines result data from the different searches and determines a scope for a subsequent search based on the combined result data.

In another aspect of the invention, a scoped search engine comprises a memory stack having memory dies including memory banks storing reference data. The scoped search engine also comprises a data comparison die including search lines, match lines, and an array of comparison cells. The scoped search engine further comprises a match analysis die including a function processor and scope registers that store result data. The comparison cells comprise an array of vertical interconnects electrically connected to respective outputs of the memory stack that stream the reference data. The search lines connect the comparison cells in columns to an input register that stores a search word. The match lines connect the comparison cells in rows to the scope registers. The function processor selectively combines the result data stored in the scope registers based on a search query.

In a further aspect of the invention a method comprises comparing a first search word to reference data records stored in a database. The method further comprises activating match lines corresponding to the reference data records that match the first search word. The method also comprises storing result data corresponding to the activated match lines in one or more scope registers. Additionally, the method comprises comparing, based on the result data stored in the scope registers, a second search word with the reference data records that match the first search word. Further, the method comprises returning match results based on the comparing of the second search word.

BRIEF DESCRIPTION OF THE SEVERAL VIEWS OF THE DRAWINGS

The present invention is described in the detailed description that follows, in reference to the noted plurality of drawings by way of non-limiting examples of exemplary embodiments of the present invention.

DETAILED DESCRIPTION

The invention relates generally to searching data, and more particularly, to iterative searching of databases using scoped searches. In accordance with aspects of the present invention, a scoped search engine combines one or more high-density memory devices and a CAM device, which provides a high-density CAM search engine. In embodiments, the devices of the high-density CAM search engine are stacked on different planes in a three-dimensional structure, wherein the memory devices connected to comparison cells of the CAM device use through-silicon vias (TSV's), such as described in U.S. patent application Ser. No. 14/280,130, the contents of which are incorporated by reference herein in their entirety.

Additionally, the scoped search engine in accordance with aspects of the present invention includes register latches that store search results from multiple searches of reference data records of a property graph database_stored in the memory device. The stored search results represent different "scope outputs" that the scoped search engine can be logically combined to determine a search result and/or serve as a basis for subsequent searches. For example, a first search result may identify reference data records in the memory device including the information "attends College X", and a second search result may identify records that include the information "drives red car." Thus, the first search result and the second search result represent different search scope outputs that the scoped search engine can combine to identify reference data records in the memory device that include both "attends College X" and "drives red car."

Moreover, in accordance with aspects of the invention, the scoped search engine can quantify the amount of matching information (i.e., "hits") included in the individual scope outputs to control subsequent searches by limiting the number of records that are searched. Doing so reduces the power consumption of the scoped search engine by limiting the scope of information included in a search query. For example, the population of reference data records in a database including the information "attends College X" can be far less than the number of those in the same population that include the information "drives red car." Thus, a scope of a search query can be reduced by searching for "attends College X" and then determining which of those reference data records also includes "drives red car."

Figure 1:
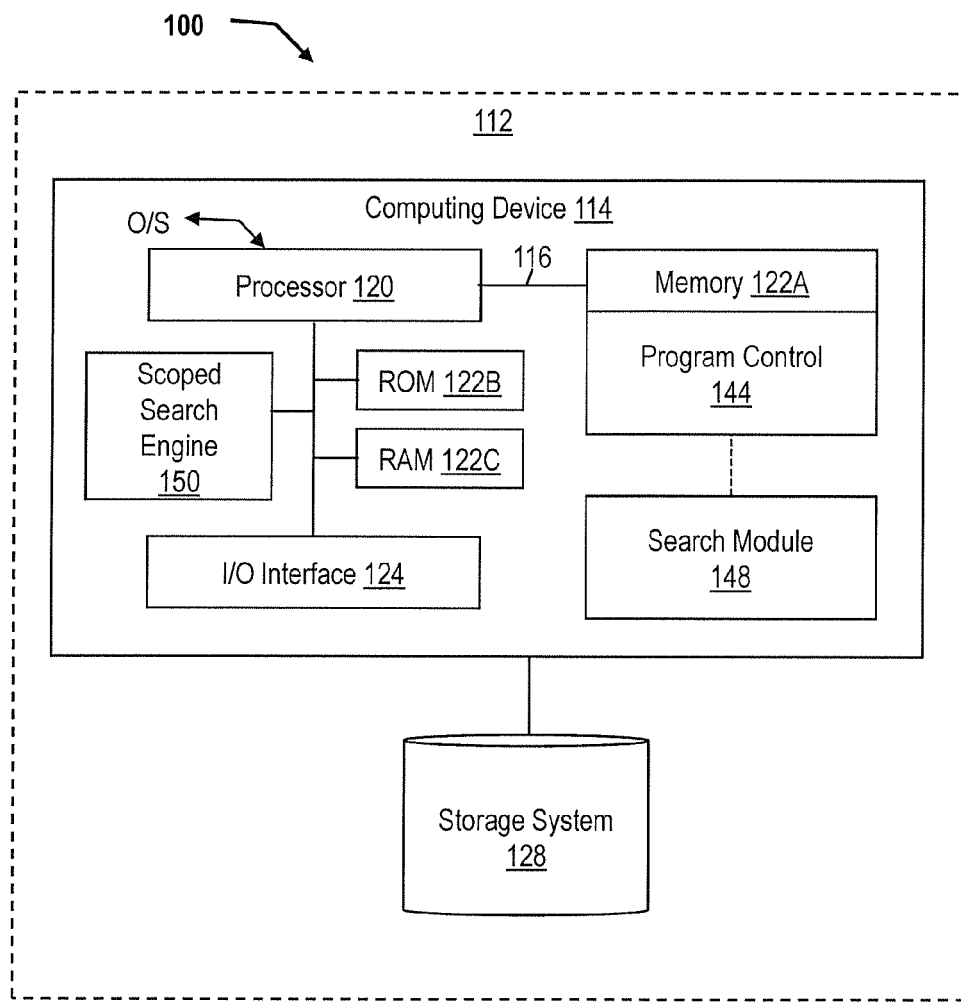
FIG. 1 illustrates an exemplary environment for implementing the steps in accordance with aspects of the invention.

FIG. 1 shows an exemplary environment 100 for implementing the steps in accordance with aspects of the invention. To this extent, the environment 100 includes a server or other computing infrastructure 112 that can perform the processes described herein. In particular, the computer infrastructure 112 includes a computing device 114. The computing device 114 can be resident on a network infrastructure or computing device of a third party service provider (any of which is generally represented in FIG. 1).

The computing device 114 also includes a processor 120, memory 122A, an I/O interface 124, and a bus 116. The memory 122A can include local memory employed during actual execution of program code, bulk storage, and cache memories which provide temporary storage of at least some program code in order to reduce the number of times code must be retrieved from bulk storage during execution. In addition, the computing device 114 includes a read-only memory (ROM) 122B, a random access memory (RAM) 122C (e.g., SRAM), and an operating system (O/S). The computing device 114 is in communication with a storage system 128. The bus 116 provides a communication link between each of the components in the computing device 114.

In general, the processor 120 executes computer program code (e.g., program control 144), which can be stored in the memory 122A and/or the storage system 128. Moreover, in accordance with aspects of the invention, program control 144 controls a search module 148 to perform one or more of the functions and/or processes described herein using scoped search engine 120. The search module 148 can be implemented as one or more sets of program code in the program control 144 stored in memory 122A as separate or combined modules. Additionally, the search module 148 can be implemented as a state machine, as separate dedicated processors, or a single or several processors to provide the functionality described herein. In embodiments, the search module 148 can be integrated in the scoped search engine 150. While executing the computer program code, the processor 120 can read and/or write data to/from the memory 122A, 122B, and 122C, the storage system 128, and the scoped search engine 150. The program code executes the processes of the invention.

In embodiments of the invention, the search module 148 includes computer program code stored in computer-readable memory (e.g., memory 122A and/or 122B) that, when executed by the processor 120, causes computing device 114 to perform a search that compares search data to reference data using the scoped search engine 150. In embodiments, the search module 148 receives the search data from a software module (e.g., a user interface module, an address look-up module, or a pattern recognition module), and initiates a search of the reference data stored in the scoped search engine 150. Additionally, in embodiments, the search module 148 controls the search performed by the scoped search engine 150. For example, the search module 148 may implement one or more methods for serially providing the reference data stored in the scoped search engine 150 to a CAM device of the scoped search engine 150. Further, in embodiments, the search module 148 can change and/or update the reference data by writing information to the memory stack of the scoped search engine 150. Moreover, based on the results provided by the scoped search engine 150, the search module 148 may determine search data and/or reference data for a subsequent search. For example, using the result data from an initial search of the reference data, the search module 148 may perform a subsequent search to obtain narrower results. Furthermore, the search module 148 may provide result data to users of the computing device 114 through the I/O interface (e.g., using a computer-user interface).

The computing device 114 can comprise any general purpose computing article of manufacture capable of executing computer program code installed thereon (e.g., a personal computer, server, etc.). However, it is understood that the computing device 114 is only representative of various possible equivalent-computing devices that may perform the processes described herein. To this extent, in embodiments, the functionality provided by the computing device 114 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 112 is only illustrative of various types of computer infrastructures for implementing the present invention. For example, in embodiments, the computing infrastructure 112 comprises two or more computing devices (e.g., a server cluster) that communicate over any type of communications link, such as a network, a shared memory, or the like, to perform the process described herein. Further, while performing the processes described herein, one or more computing devices on the computing infrastructure 112 can communicate with one or more other computing devices external to the computing infrastructure 112 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 2:
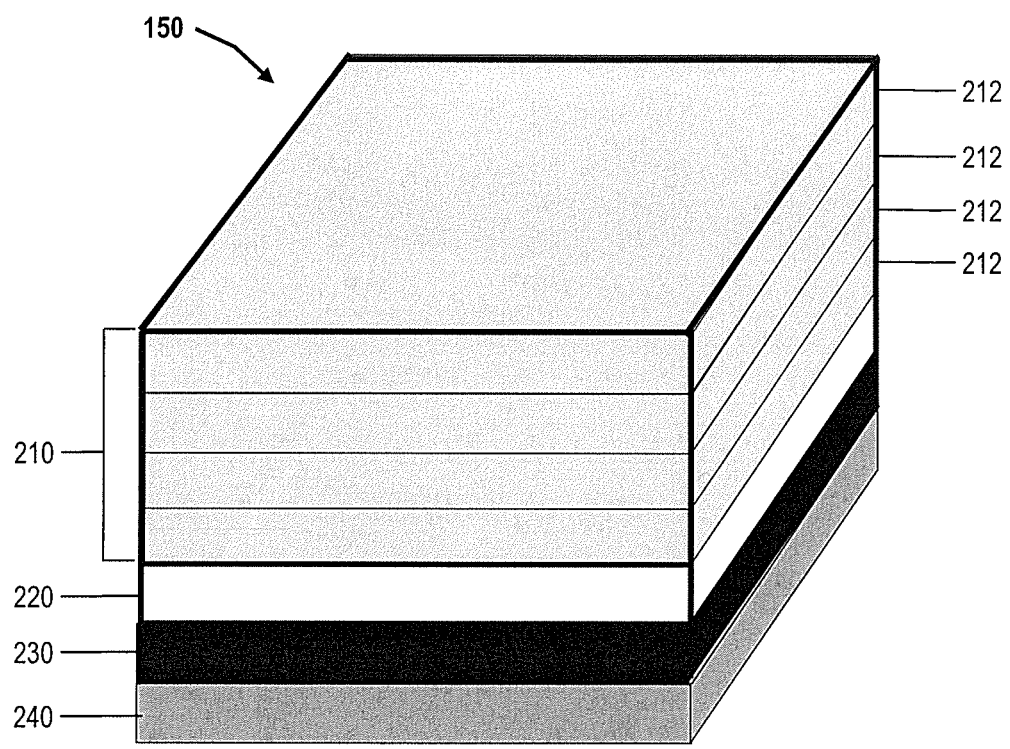
FIG. 2 illustrates a CAM search engine in accordance with aspects of the present invention.

FIG. 2 illustrates a scoped search engine 150 in accordance with aspects of the present invention. The scoped search engine 150 includes a memory unit 210, a data formatting unit 220, a data comparison unit 230, and a match analysis unit 240. The scoped search engine 150 provides a serial stream of reference data from the memory unit 210 into the data comparison unit 230 for comparison with search data of a search query. Memory banks in the memory unit 210 time-share comparison cells of a CAM device in the data comparison unit 230 (e.g., a binary CAM device or a ternary CAM device).

According to aspects of the invention, the memory unit 210 is a high-density memory device (e.g., greater than 64 gigabytes) which includes a number of memory banks. In embodiments, the memory unit 210 is a stacked, three-dimensional (i.e., "3D") memory array including memory dies 212, each of which includes one or more of the memory banks. For example, the memory unit 210 is a stack of DRAM banks formed using several substantially identical memory dies 212s.

The data formatting unit 220 includes structures and logic for interfacing the memory unit 210 with the data comparison unit 230. The data formatting unit 220 aggregates reference data provided from the memory unit 210 and remaps the reference data into a format for the data comparison unit 230. In embodiments, the data formatting unit 220 is one or more dies stacked beneath the memory unit 210. The data formatting unit 220 includes parallel interconnects that make electrical connections between the outputs of memory banks in the memory unit 210 and the comparison cells in the data comparison unit 230. In embodiments, the parallel interconnects include TSVs through the data comparison unit 220. The parallel interconnects of the data formatting unit 220 routes the reference data to comparison cells in the data comparison unit 230 using an array of parallel vertical TSVs that vertically align with the comparison cells. Accordingly, by implementing aspects of the invention, the parallel interconnects of the data formatting unit 220 physically route outputs of the memory unit 210 that are not in direct physical alignment with corresponding comparison cells in the data comparison unit 230. For example, the memory unit 210 can connect to the data formatting unit 220 at the locations vertically corresponding to the output pins of DRAM banks of the memory unit 210.

The data comparison unit 230 includes structures and logic for determining whether reference data matches a given set of search data. The data comparison unit 230 includes a CAM device (e.g., a binary CAM or a ternary CAM) having an array of parallel load vertical interconnects that stream reference data from the memory unit 210 for comparison with search data using a CAM structure, as described in greater detail below. In embodiments, the data comparison unit 230 is one or more dies stacked beneath the memory unit 210 and/or the data formatting unit 220.

The scoped search engine 150 includes logic (e.g., search module 148 of FIG. 1) that uses the records stored in the data storage devices to control streaming of reference data from the memory unit 210 to the data comparison unit 230. In embodiments, high-density macros (e.g., search module 148) control the scoped search engine 150 to stream reference data in a predictable manner from the memory unit 210 to the data comparison unit 230.

The match analysis unit 240 includes one or more dies that store and/or combine search results determined by the data comparison unit 230. Thus, the match analysis unit 240 stores results from multiple different search queries executed by the CAM device for further analysis, searching (e.g., a combined-search), and/or outputting to a system (e.g., computer infrastructure 112). The match analysis unit 240 includes one or more data storage devices (e.g., RAM) that store result data determined by the CAM device in the data comparison unit 230. Additionally, the data storage devices can store information (e.g., identifying information, addresses, and count of matches) corresponding to the stored result data. In embodiments, the match analysis unit 240 is stacked beneath the memory unit 210, the data formatting unit 220, and/or the data comparison unit 230.

FIG. 2 illustrates the scoped search engine 150 as three-dimensional stacked device having the memory unit 210, the data formatting unit 220, the data comparison unit 230, and the match analysis unit 240 as layers in the three-dimensional stack in accordance with aspects of the present invention. However, the scoped search engine 150 is not limited to this arrangement. It is understood that embodiments of the invention can incorporate the above-described structures within one or more layers that combine the elements and functionality of the memory unit 210, the data formatting unit 220, the data comparison unit 230, and/or the match analysis unit 240. For example, the above-described logic and data storage devices of the match analysis unit 240 can be incorporated in any one of the memory unit 210, the data formatting unit 220, the data comparison unit 230, the match analysis unit 240, or distributed amongst them.

Figure 3:
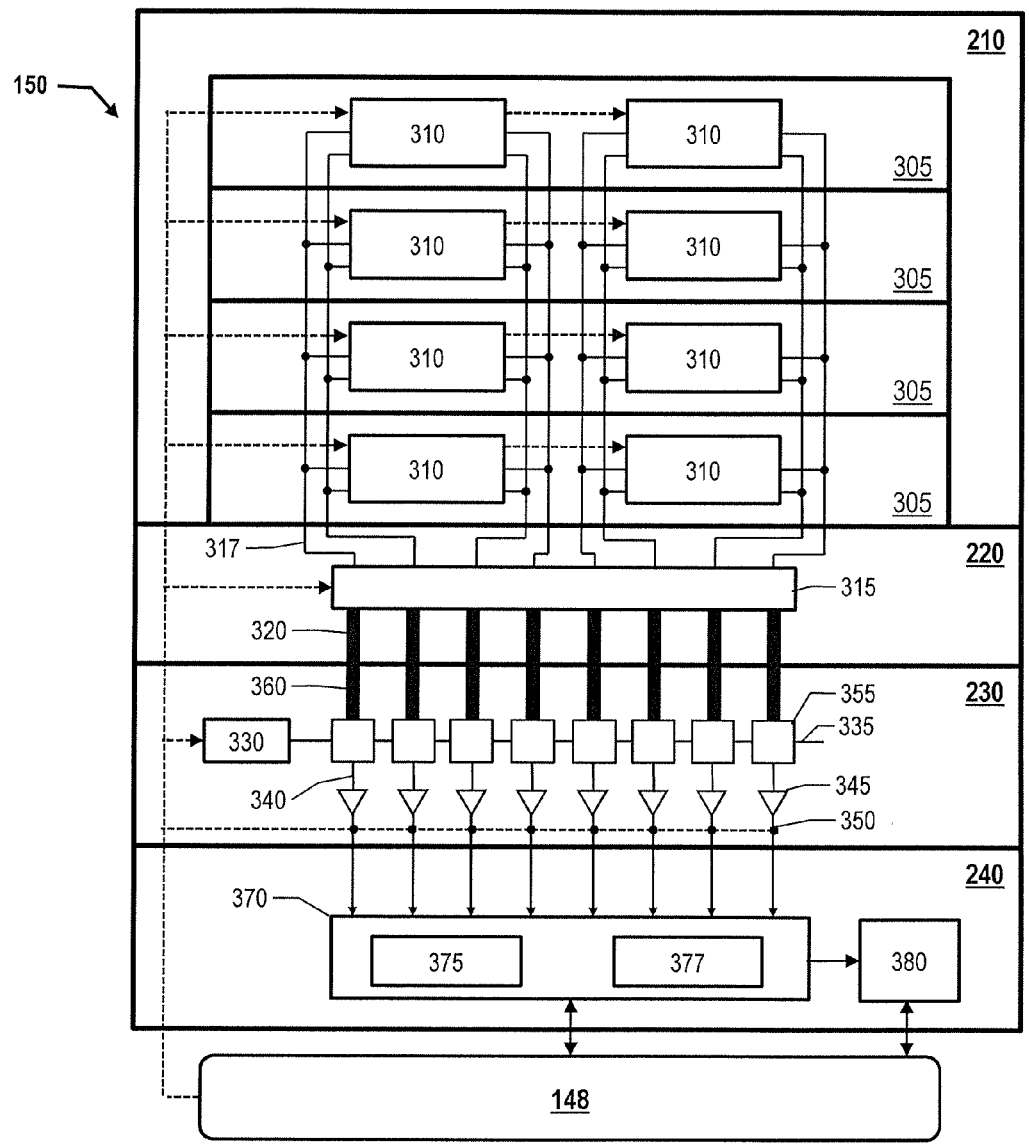
FIG. 3 illustrates a functional block diagram of an exemplary CAM search engine in accordance with aspects of the present invention.

FIG. 3 illustrates a functional block diagram of exemplary scoped search engine 150 in accordance with aspects of the present invention. As described previously, in embodiments the scoped search engine 150 is a stacked, 3D device including, search module 148, memory unit 210, data formatting unit 220, data comparison unit 230, and match analysis unit 240, which may be the same as those already described herein. In accordance with aspects of the invention, the search module 148 controls processes of the scoped search engine 150. The search module 148 can be external to the scoped search engine 150 or it can be incorporated (partially or entirely) within to the scoped search engine 150. In embodiments, the search module 148 is one or more sets of program code stored in memory (e.g., memory 122A) and executed by a processor (e.g., processor 120) of a computer device (e.g., computing device 114) that includes the scoped search engine 150 (which may be the represented as CAM search engine 120). In other embodiments, the search module 148 is implemented as a state machine or as separate dedicated data processor devices, incorporated in the scoped search engine 150.

The memory unit 210 includes memory dies 305. Each of the memory dies 305 includes one or more memory banks 310. The memory banks 310 can be DRAM cores. In embodiments, the memory dies 305 are vertically stacked to form a stacked, 3D memory device, wherein inputs and outputs of the memory banks 310 of the memory unit 210 can be through the bottommost one of the memory dies 305 in the memory unit 210.

The data formatting unit 220 aggregates and routes information reference data provided from the memory unit 210 to the data comparison unit 230. In embodiments, the data formatting unit 220 includes a data buffer 315 and parallel vertical die interconnects 320. The parallel die interconnects 320 can be TSVs through the die of the data comparison unit 230. The data buffer 315 can queue a subset of the reference data selected by the search module 148 from the memory unit 210 before providing the subset of reference data to the data comparison unit 230. For example, the search module 148 can select the subset of the reference data in one or more of the memory banks 310 for comparison with search data of the search query. The selected subset of reference data is queued in the data buffer 315 and then provided to the data comparison unit 230. In this manner, the data comparison unit 230 is time-shared among the memory banks 310. Notably, while the data buffer 315 is shown in FIG. 3 in the data formatting unit 220, the data buffer 315 and/or its functionality can, instead, be incorporated in the memory unit 210 or the data comparison unit 230. For example, the search module 148 may control the memory unit 210 to queue the subset of reference data before streaming it to the data comparison unit 230.

Additionally, the data formatting unit 220 includes wiring 317 that provides electrical connections between the outputs of memory banks 310 in the memory unit 210 and the data comparison unit 230. In accordance with aspects of the invention, the wiring 317 and the parallel die interconnects 320 physically route outputs of the memory unit 210 that are not in direct alignment with corresponding comparison cells in the data comparison unit 230. For example, the memory unit 210 may connect to the data formatting unit 220 at the locations corresponding to output pins of DRAM banks of the memory unit 210. The data formatting unit 220 routes the reference data to the comparison cells in the data comparison unit 230 using the array parallel die interconnects 320 that are vertically aligned with the comparison cells in the data comparison unit 230.

The data comparison unit 230 includes input register 330, search lines 335, match lines 340, sense amplifiers 345, outputs 350, comparison cells 355, and parallel vertical interconnects 360. In embodiments, the search module 148 loads a word of search data into the input register 330 and controls the memory unit 210 to selectively provide a subset of reference data to the comparison cells 355 via the parallel vertical interconnects 360. The search module 148 controls the input register 330 to apply the word of search data to the subset of reference data via the search lines 335. Then, the search module 148 reads and/or stores results provided from the match lines 340 to the sense amplifiers 345 via the outputs 350 to the match analysis unit 240.

The match analysis unit 240 includes one or more hardware data storage devices 370, and one or more function processors 380. The hardware storage device 370 includes one or more scope registers 375 and one or more memory devices 377 (e.g., RAM). The scope registers 375 store result data output by the data comparison unit 230. Each word of result data determined by the data comparison unit 230 is a "scope output" comprising a word (i.e., "vector") of digital values corresponding to a respective search scope. For example, the scope registers 375 include bits having a high digital logic state ("1") corresponding to each matching word (i.e., "hits") in a subset of reference data compared to the search data in one iterative comparison. Likewise, the scope registers include bits having a low digital logic state ("0") corresponding to each non-matching word of the reference data (i.e., "misses"). In embodiments, the scope registers 375 are sticky latches that retain matches when power to the scope registers 375 and/or the data storage device 370 is removed (e.g., in an idle or a sleep state). Notably, each scope register 375 can correspond to a large amount of data. For example, a database may include an entire memory bank 310 of information about an individual (e.g., "John Smith"). However, a single one of scope registers 375 may indicate that the individual appeared in a search result.

The memory device 377 can store information corresponding to each bit of the scope output stored in the scope registers 375. This information can, for example, identify the reference information associated with the bits of the scope outputs and/or the address of that reference information in the memory unit 210 such that it can be located and retrieved based on the contents of the scope outputs. For example, for each hit in the scope registers, the memory device 377 may store an address or a pointer to respective reference data in the memory unit 210.

The function processor 380 selectively retrieves and/or combines the scope output stored in the scope registers 375. In embodiments, the search logic 148 determines the data in the scope registers 375 to be combined, and controls the function processor 380 to combine the data. Thus, the scope output stored in the scope registers 375 can be selectively combined to determine scope result data, which can be output as a query result and/or used as search data in subsequent searches. For example, the search logic 148 can retrieve the contents of two or more of scope registers 375 and use the function processor 380 to combine them using logic functions (e.g., AND, NAND, OR, and NOR). The scope result data determined by the function processor 380 can control both subsequent searches by the data comparison unit 230 and data flow from the memory unit 210. Additionally, the search module 148 can feed back the scope result data stored on the match analysis unit 240 to the memory unit 210 for use as scoped search data that is compared to another word of search data by the scoped search engine 150.

Figure 4:
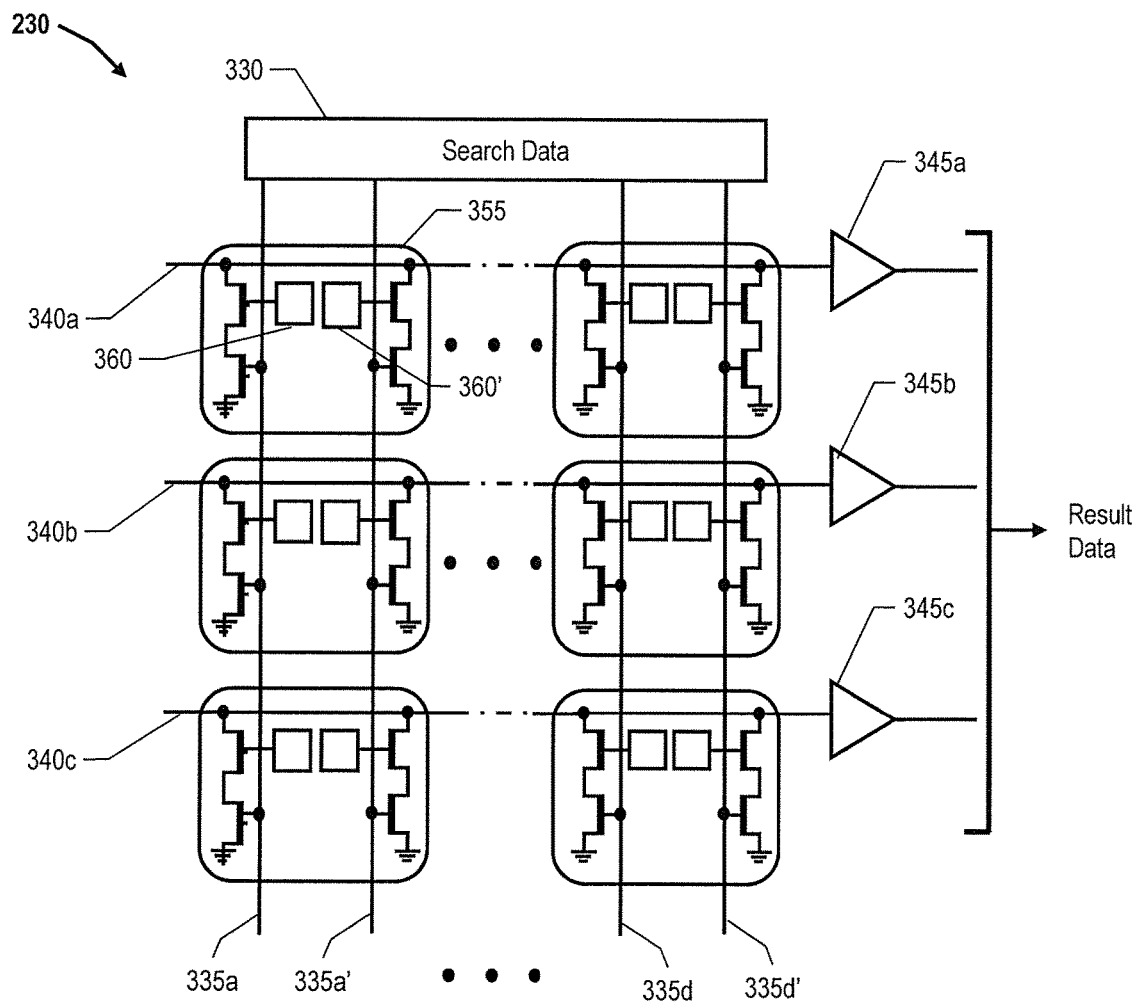
FIG. 4 illustrates an exemplary data comparison unit in accordance with aspects of the present invention.

FIG. 4 shows an exemplary data comparison unit 230 in accordance with aspects of the invention. In embodiments, the data comparison unit 230 includes input register 330, search lines pairs 335a/335a' . . . 335d/335d', match lines 340a . . . 340c, and sense amplifiers 345a . . . 345c. Additionally, the data comparison unit 230 includes a CAM device, which is an array of data comparison cells 355 that compare each bit of search data held in the input register 330 with reference data streamed from a memory device (e.g., memory banks 310 in the memory unit 210). In accordance with aspects of the invention, the reference data is provided from the memory device to comparison cells 355 by respective pairs of parallel vertical interconnects 360 and 360'. The vertical interconnects 360 and 360' can be, for example, TSVs, which have been previously described herein.

Search data to the input register 330 (e.g., by search module 148) is applied to the search lines 335a/335a' . . . 335d/335d'. Reference data is applied to the data comparison cells 355 through respective pairs of the vertical interconnects 360 and 360'. For each specific word of search data applied to the search lines 335a/335a' . . . 335d/335d', the match lines 340a . . . 340c indicate whether the reference data matches the search data. The sense amplifiers 345a . . . 345c receive the result of matching from the match lines 340a . . . 340c and output signals of a corresponding digital logic state. For example, if the reference data along match line 340a matches the search data (either entirely or based on wildcards), then the result data output by the sense amplifier 345a will be a high digital logic voltage. If the reference data along match line 340b does not match the search data, then result data output by sense amplifier 345b will be a low digital logic voltage. Put another way, a match between a word of reference data and the search data causes the corresponding match line to have an active state (i.e., an active match line).

In accordance with aspects of the invention, subsets of the reference data stored in a high-density memory device (e.g., memory unit 210) are serially provided to the data comparison unit 230. For example, each subset of reference data can be applied to the vertical interconnects 360/360' of the comparison cells 355. As such, the data comparison unit 230 may use a number of iterations are used to compare an entire set of reference data in the memory device to the search data. Each set of result data output from a search iteration comprises a scope output.

For the sake of illustration, FIG. 4 shows the data comparison unit 230 as including only four pairs of search lines 335a/335a' . . . 335d/335d', three match lines 340a . . . 340c, three sense amplifiers 345a . . . 345c, and a 2×3 array of comparison cells 355. However, embodiments of the data comparison unit 230 can include a greater number of these structures. For example, the comparison cells 355 of the CAM device may be a 64×64 array, and the comparison unit 230 can include a corresponding number of search lines, match lines, and sense amplifiers.

Figure 5:
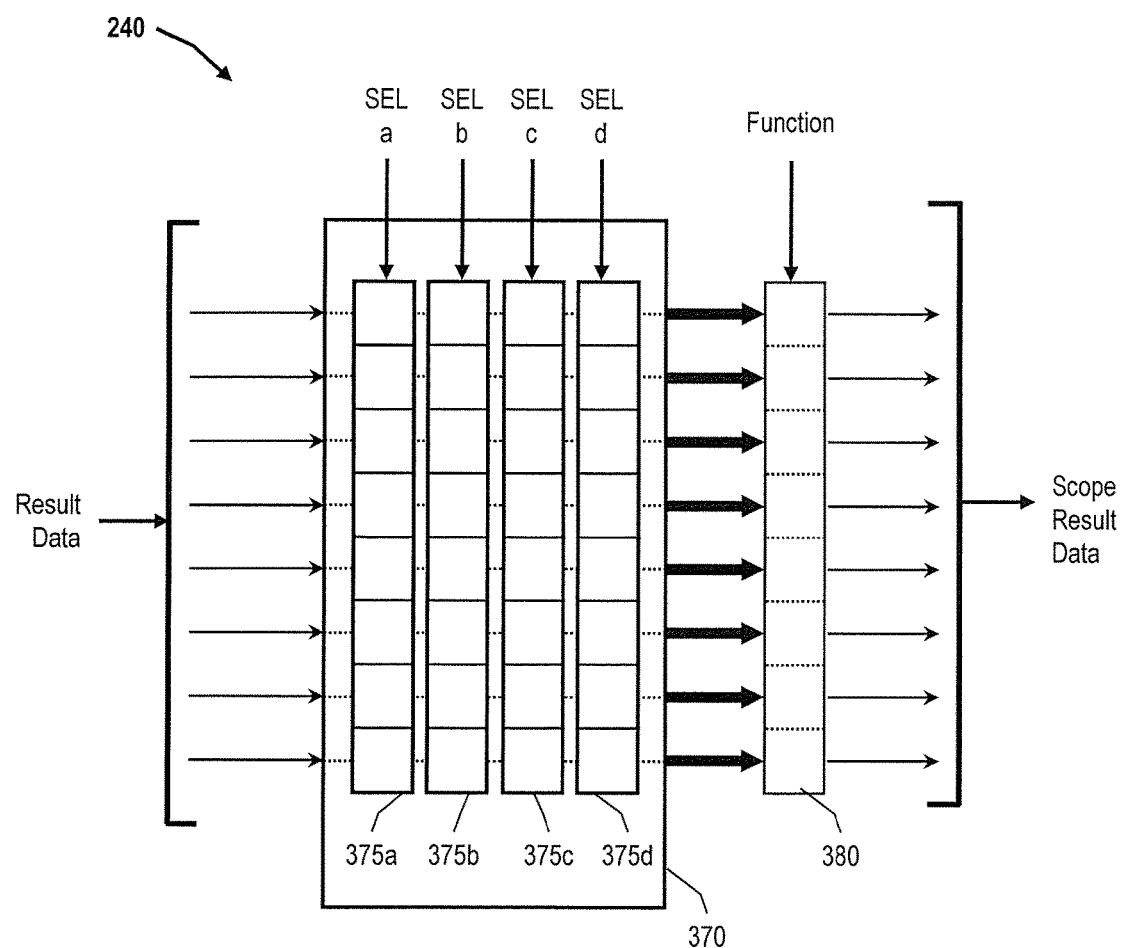
FIG. 5 illustrates an exemplary match analysis unit in accordance with aspects of the present invention.

FIG. 5 shows an exemplary match analysis unit 240 in accordance with aspects of the invention. The match analysis unit 240 includes data storage device 370, scope registers 375a . . . 375d and function processor 380, which may be the same as described previously herein. Each scope register 375a . . . 375d of the data storage device 370 can be selectively activated to receive the result data by control logic (e.g., search logic 148) using respective one of select inputs SELa . . . SELd. For example, the control logic (e.g., search module 148) can control scope register 375a to store a first set of result data (i.e., a first scope output) and control scope register 375b to receive a second set of result data (i.e., a second scope output). Thus, each of the scope registers 375a . . . 375d stores a particular set of result data corresponding to a scope of a particular set of search data (i.e., a "scope vector"). Additionally, the control logic can control the function processor 380 to logically combine the contents of two or more of the scope registers 375a . . . 375d to produce scope result data, which may be a final result of search query, or used to perform a subsequent scoped search.

For the sake of illustration, FIG. 5 shows the match analysis unit 240 as including only four scope registers 375a . . . 375d and one function logic device 380. However, embodiments of the invention are not limited to the illustrated embodiment. Other embodiments of the match analysis unit 240 can include a greater number of scope registers and function logic devices, and associate them different combinations (e.g., nested or parallel). For example, each of the scope registers 375a . . . 375d can represent a bank of registers that store result data from different searches.

Figure 6:
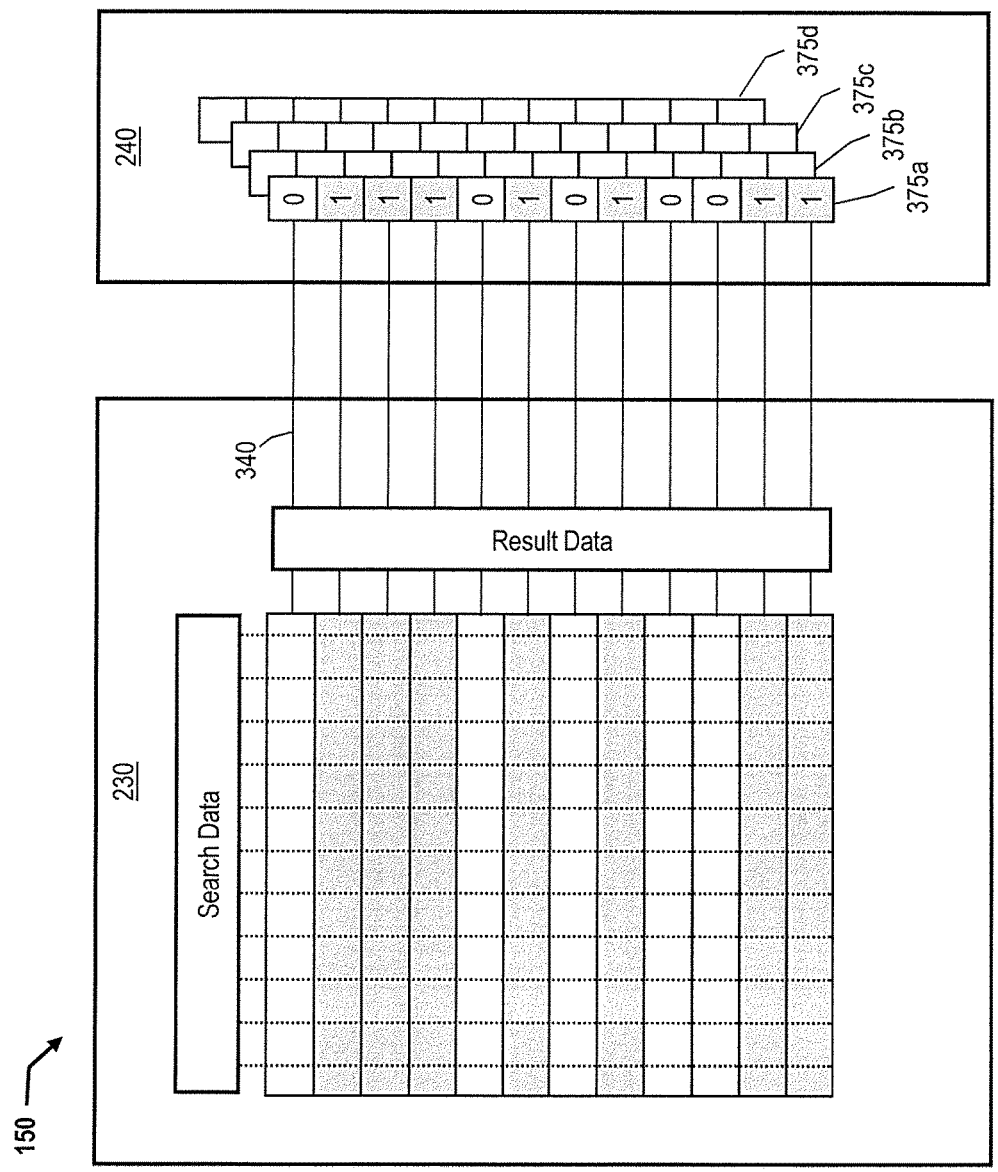
FIG. 6 illustrates a functional flow diagram of an exemplary scoped search using a scoped search engine in accordance with aspects of the present invention.

FIG. 6 illustrates a functional flow diagram of an exemplary scoped search using scoped search engine 150 in accordance with aspects of the present invention. Scoped searching enables the scoped search engine 150 to store scope outputs in the scope registers 375a . . . 375d such that different result data can be combined to provide a combined search result and/or change the scope of a subsequent search. In accordance with aspects of the invention, a scoped search only acts on the search results having "hits," which are active match lines 340 marked as '1' in a scope bit vector. The search results can be combined using logical operators (e.g., AND, NAND, OR, and NOR) and can be iterated over the search results in a sorted order. Marking or latching search results from previous searches enables the scoped search engine 150 to limit the scope of a subsequent search to a particular subset of data, rather than an entire database of records. Additionally, scoped searching saves power on the subsequent searches by operating on a view or a subgraph or a meta-graph node of the database and logically combining results of subsequent searches.

In accordance with aspect of the invention, scoped search engine 150 performs scoped searching using data comparison unit 230 and the match analysis unit 240, which can be the same as those previously described herein. The data comparison unit 230 performs a parallel comparison between reference data and a word of search data for a search query. Result data develops on match lines 340 of the data comparison unit 230 indicating whether or not the respective words included in the reference data matches the search data (i.e. a "hit"). The search results on the match lines 340 are stored in one of the scope registers 375a . . . 375d in the match analysis unit 240. Control logic (e.g. search module 148) selects a particular one of the search registers 375a . . . 375d to store the result data. Thus, particular result data comprising scope outputs from different combinations of reference data and search data are stored in different ones of the scope registers 375a . . . 375d. The search logic can then selectively combine the search results stored in the scope registers 375 to perform scoped searches of the result data and/or other reference data. For example, a first search word can be information representing "teaching at College X."

The search data can be compared against the reference data in, e.g., memory of the search engine. Any matches (i.e., hits) between the reference data and the search data can then be stored in a first one of the scope registers 375 of the match analysis unit 240. A second search word can be information representing "drives a red car." The search data can be compared against the reference data in, e.g., memory of the search engine. Any matches can then be stored in a second one of the scope registers 375 of the match analysis unit 240. These two resulting search outputs stored in the registers can be combined using an AND function. The result of which could be used to identify any stored in records in a database including teaches at College X and drives a red car.

Additionally, in accordance with aspects of the invention, the match analysis unit 240 determines a count of the "hits" stored in each of the scope register 375a . . . 375d and stores the counts in association the scope registers 375a . . . 375d. For example, the counts 7, 1, 2, and 4 may be associated with scope registers 375a, 375b, 375c, and 375d, respectively. The search logic can use the counts to determine an optimized query for a subsequent scoped search that will reduce the power consumed by the scoped search engine 150.

Figure 7:
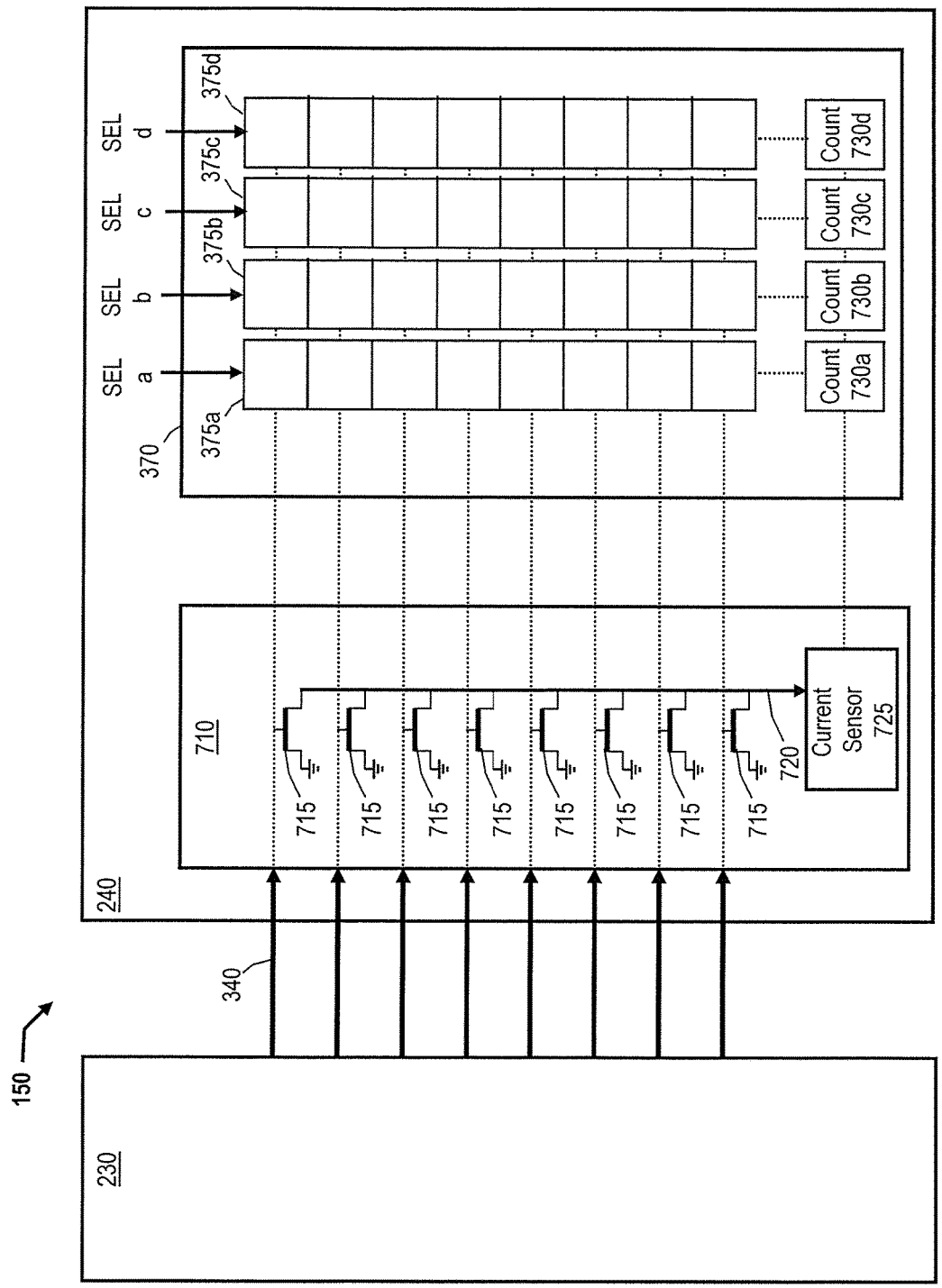
FIG. 7 illustrates a functional flow diagram of scoped counting in an exemplary scoped search engine in accordance with aspects of the present invention.

FIG. 7 shows a functional flow diagram of scope counting by scoped search engine 150 in accordance with aspects of the present invention. In embodiments, scope outputs generated by the data comparison unit 230 are stored in scope registers 375a . . . 375d of the match analysis unit 240, and are combined and/or prioritized based on the count of "hits" recorded in each of the scope registers 375a . . . 375d. By doing so, embodiments of the present invention reduce the amount of information searched by the scoped search engine 150 and, thereby, reduce its power consumption. In accordance with aspects of the invention, the count of the hits in the search registers is a rough estimation of the number of hits. Put another way, the count does not need to be 100% accurate. Accordingly, embodiments of the present invention minimize the complexity of counting logic by providing an estimate of the number of hits stored in any particular scope register.

The scoped search engine 150 includes data comparison unit 230 and match analysis unit 240, which may be the same as those previously described herein. The match analysis unit 240 includes scope registers 375a . . . 375d, which may also be the same as previously described herein. Additionally, the match analysis unit 240 includes counting logic 710 that counts a number of hits included in the search results on match lines 340. In accordance with aspects of the invention, each of the scope registers 375a . . . 375d is associated with a respective count 730a . . . 730d indicating the number of "hits" currently stored in each of scope registers 375a . . . 375d. The counts 730a . . . 730d may be stored in the scope registers 375a . . . 375d, or elsewhere (e.g., memory device 377). The counting device 710 determines the values of the counts 730a . . . 730d. As noted above, the values stored counts 730a . . . 730d can be a rough estimate of the total number of hits stored in a respective one of the scope registers 375a . . . 375d.

The counting device 710 illustrates an exemplary embodiment for determining the counts 730a . . . 730d from outputs of the data comparison unit 230. The counting device 710 includes FET transistors 715 with their gates receiving respective bits of result data from the data comparison unit 230 via match lines 340. The sources of each of the transistors 715 connect to a common sense line 720. The values of the result data are digital logic values indicating whether a corresponding word of the reference data is a match (e.g., a high digital logic state) or not a match (e.g., low digital logic state). The common sense line 720 is connected to a current sensing device 725. Each of the transistors 715 activates when a respective bit of the result data is a "hit" (i.e., high digital logic state), which incrementally increases the current flow through the current sensor 725. Thus, the current flow through the current sensor 725 is proportional to the number of active transistors 715. The current sensor 725 can, thereby, store a value in the counts 730a . . . 730d that is proportional to the current flow. For example, each count may be a value between 0 and 63, wherein 0 represents no hits and 63 represents one hundred percent hit rate. The count 730a . . . 730d of each of the scope registers can be used by control logic (e.g., by search module 128) to control the order of subsequent searches. For example, based on the counts 730a . . . 730d, the order of subsequent searches using the information in the scope registers 375a . . . 375d can be prioritized.

Figure 8:
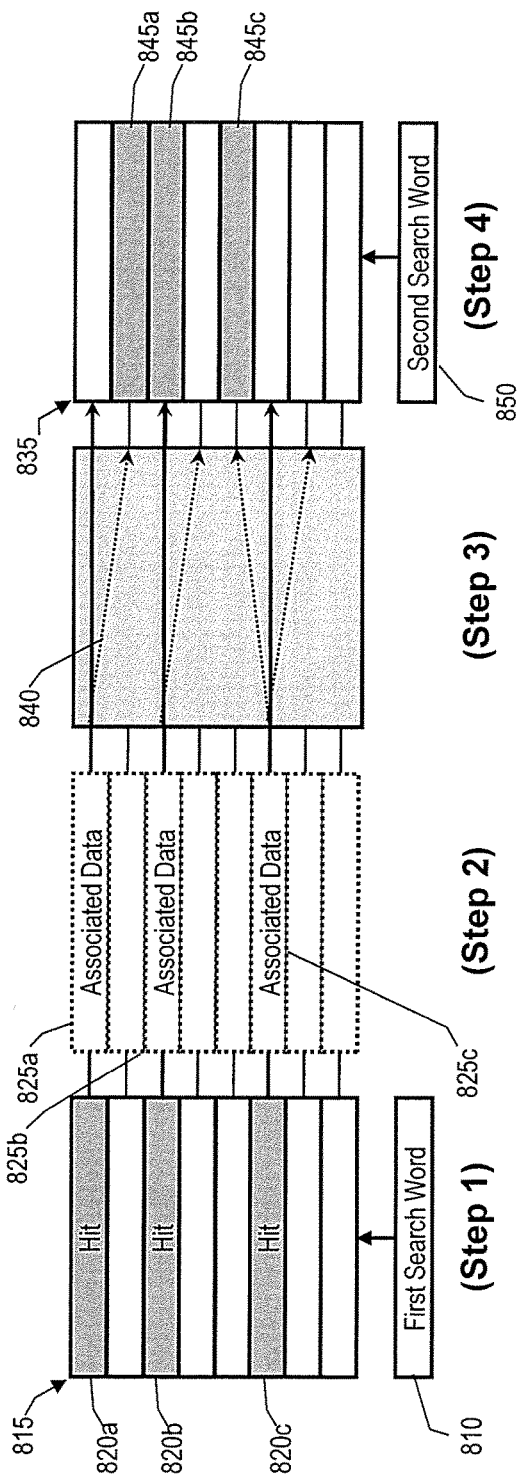
FIG. 8A illustrates a functional flow diagram of indirect scoped searching in accordance with aspects of the present invention.
FIG. 8B illustrates exemplary data structures in accordance with aspects of the present invention.

FIG. 8A illustrates an exemplary functional flow diagram of a scoped search in accordance with aspects of the present invention. Scoped search uses search results from previous searches (e.g., scope outputs in scope registers 375) to modify the scope of subsequent searches. Scoped searches can be used for searching databases structured as property graphs, which include cascading chains of hits with dependent reads. In embodiments, the scope of a subsequent search can be modified by limiting the subsequent search to records of a property graph database identified as hits in a previous search. Additionally, the scope of the subsequent search can be modified to include records of the property graph database that are associated with the hits in the previous search.

At Step 1, a scoped search engine (e.g., scoped search engine 150) performs a first search by comparing a first search word 810 to a first set of reference data 815 (e.g., some or all of the data stored in memory unit 210) using a CAM search device (e.g., data comparison unit 230) in a manner previously described herein. The result data of the first search include a number of hits 820a . . . 820c corresponding to words of the first reference data 815 that match the first search word 810 (either entirely or based on wildcards).

At Step 2, the scoped search engine can modify the scope of the subsequent search by including associated data 825 corresponding to each of the first hits 820 determined in Step 1. Associated data 825a . . . 825c represent data associated with the hits 820 of result data from Step 1. The associated data 825a . . . 825c can be stored in the memory device (e.g., memory unit 210) along with the reference data. An index table may maintain the associations between reference data and the corresponding associated data. For example, particular records of referenced data may be associated with the first hit 820a and have a pointer to associated data 825a. Each of hits 820a . . . 820c can be associated with more than one data record. For example, hit 820c is associated with two records of associated data. Thus, a second set of reference data 835 for a second search includes a combination of the first matching result data 820a . . . 820c and their associated data 825a . . . 825c.

At Step 3, the scoped search engine can feed back the first hit data 820a . . . 820c determined at Step 1 and the associated data 825a . . . 825c determined at Step 2 to the CAM device as the second set of reference data 835. Lines 840 represent associated data 825a . . . 825c being combined with the hits 820a . . . 820c from the first set of reference data 815 to provide scope output data for use as the second set of reference data 835. At Step 4, the CAM search engine compares a second search word 850 to the second set of reference data 835 provided to the CAM device at Step 3. Hits 845a . . . 845c represents the words of second set of reference data 835 determined by the CAM search engine to match the second search word 850.

The above-described scoped searching enables parallel traversal of data stored in property graphs databases by gathering all associated data and using it to generate a scope bit vectors used for a subsequent search. Accordingly, scoped searching can combine multiple scope vectors (e.g. from multiple property graph traversals). Additionally, as described previously, the scoped search engine may compare the counts hits in scope vectors (including the scope vectors of associated data) to chose a next scope in order to optimize traversal order.

In accordance with aspects of the invention, scoped searches can be applied horizontally or vertically to memory banks (e.g., memory banks 310) of a memory unit (e.g., memory unit 210) in a HDTCAM (e.g., scoped search engine 150). In embodiments, reference data can be stored in the HDTCAM such that different scopes of reference data are stored in different plane of the HDTCAM. For example, properties of an entry could be divided over planes of the memory unit. Additionally or alternatively, different planes of the memory unit can store different parts of a property graph database. By organizing reference data of a property graph database different planes and or parts of the memory, the speed at which HDTCAM searches and retrieves can be increased.

FIG. 8B shows exemplary data structures in accordance with aspects of the present invention. The data structures include reference data 850 and associated data index 870, which are part of a database stored in a memory device (e.g., memory unit 210). The reference data 850 includes records 855a . . . 855c. In embodiments, the database has a property graph structure, wherein reference data records 855a . . . 855c include a reference number, a label, and one or more properties. In accordance with aspects of the invention, the reference data records 855a . . . 855c are vertices or edges of the property graph such that the certain vertices are associated with one another by edges. The associated data index 870 stores records 875a . . . 875c defining the associations between the reference data records 855a . . . 855c in the reference data. In embodiments, the associations of the associated data records 875a . . . 875c are identified by reference numbers of the reference data records 855a . . . 855c. For example, associated data record 875a corresponds to reference data record 855a. The associated reference number "2" of associated data record 875a indicates that reference data record 855*a* is associated with reference data record 855*b*, which has reference number "2". Additionally, the number of associated entries "1" of associated data record 875*a* indicates the number of adjacent records of reference data 850 that are associated with reference data record 855*a*. For example, associated data record 875*a* indicates that only one of the reference data records (i.e., reference data record 855*b*) is associated with reference data record 855*a*. Notably, the number of associations is not limited to one. For example, associated data record 875*b* indicates that reference data record 855*b* is associated with three adjacent reference data records starting at reference number "3."

In accordance with aspects of the invention, the records in the associated data index 870 are used to perform indirect scoped searching. For example, the associations 875*a* and 875*b* in the associated data index 870 indicate that "Sam knows Dave." That is, associated data record 875*a* associates vertex "Sam" with the edge "knows," and the associated data record 875*b* associates the edge "knows" with the vertex "Dave." Thus, in accordance with aspects of the invention, if the scoped search engine (e.g., scoped search engine 150) performs a first search query and determined that reference data 855*a* matches a given search word, then the scoped search engine can combine that result data with its associated data based on the associated data index 870. Accordingly, the scope of a subsequent search query can be limited to records of reference data that matched the search word (e.g., reference data 855*a*) and any records of reference data associated with the matching records (e.g., reference data 855*b*). Thus, indirect scoped searching allows traversal of data in a property graph database by incorporating the associated data into the scoped outputs for a subsequent search.

Figure 9:
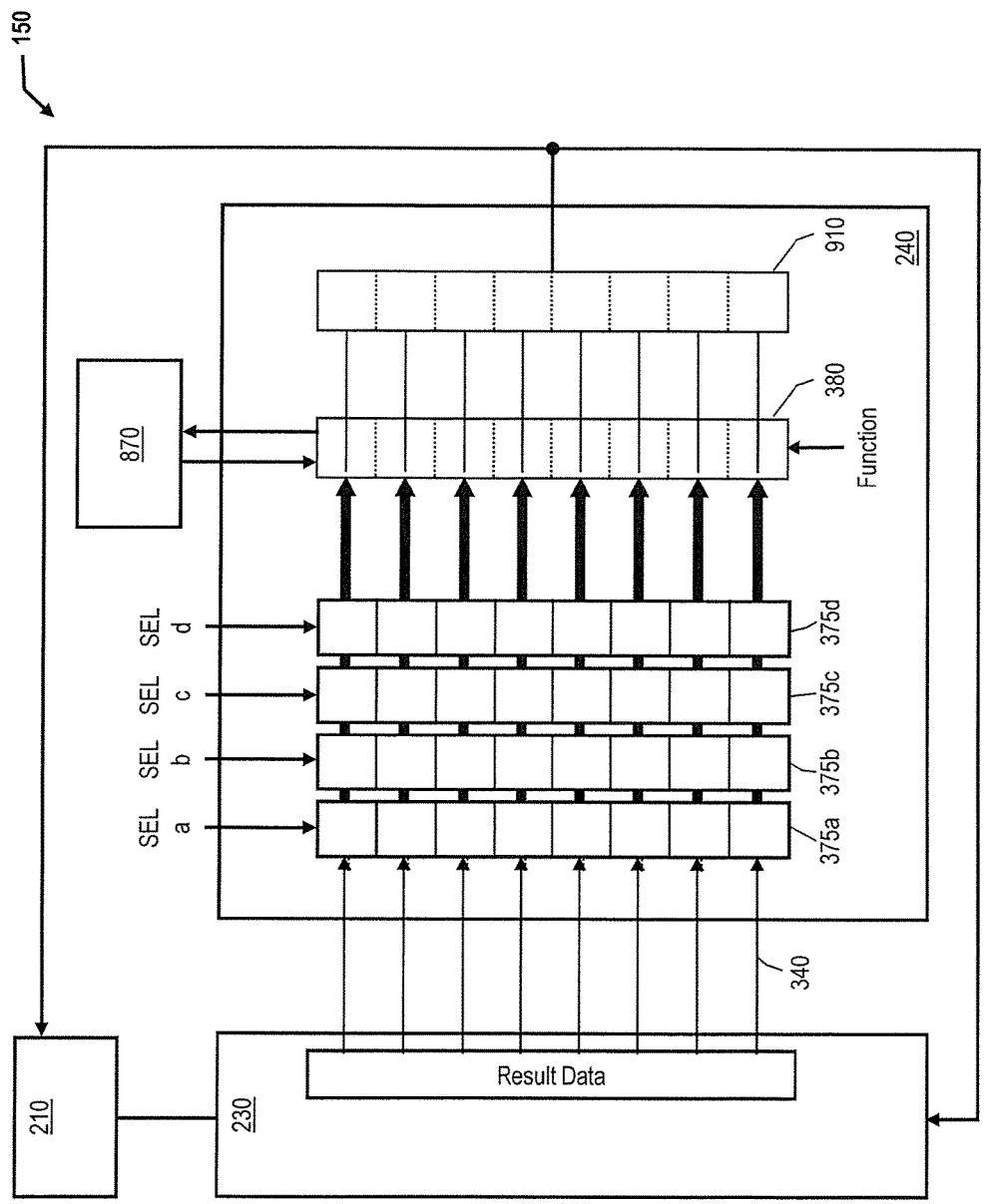
FIG. 9 illustrates a functional flow diagram of scoped searching using an exemplary scoped search engine in accordance with aspects of the present invention.

FIG. 9 illustrates an exemplary functional flow diagram for scoped searching using scoped search engine 150 in accordance with aspects of the present invention. The scoped search engine 150 includes memory unit 210, data comparison unit 230, match analysis unit 240, match lines 340, scope registers 375*a* . . . 375*d*, function processor 380, and associated data index 870, which can same as previously described herein. Additionally, the scoped search engine 150 includes scope result register 910 which stores scope result data output by the function processor 380. In accordance with aspects of the invention, control logic (e.g., search module 148) controls function processor 380 to assemble data for performing scoped searching. For example, control logic controls the function processor 380 to retrieve data associated with result data stored in two or more of the scope registers 375*a* . . . 375*d* based on the associated data index 870 and stores the associated data in the scope registers 375*a* . . . 375*d*. Additionally, the control logic controls the function processor 380 to logically combine the scoped outputs and/or their associated data in two or more of the scope registers 375*a* . . . 375*d* (e.g., by selectively enabling SELa . . . SELd) and stores the scope result data in the scope result register 910. The scope result data can be used to control subsequent searches by the scoped search engine 150 and to control data flow from the memory unit 210.

Figure 10:
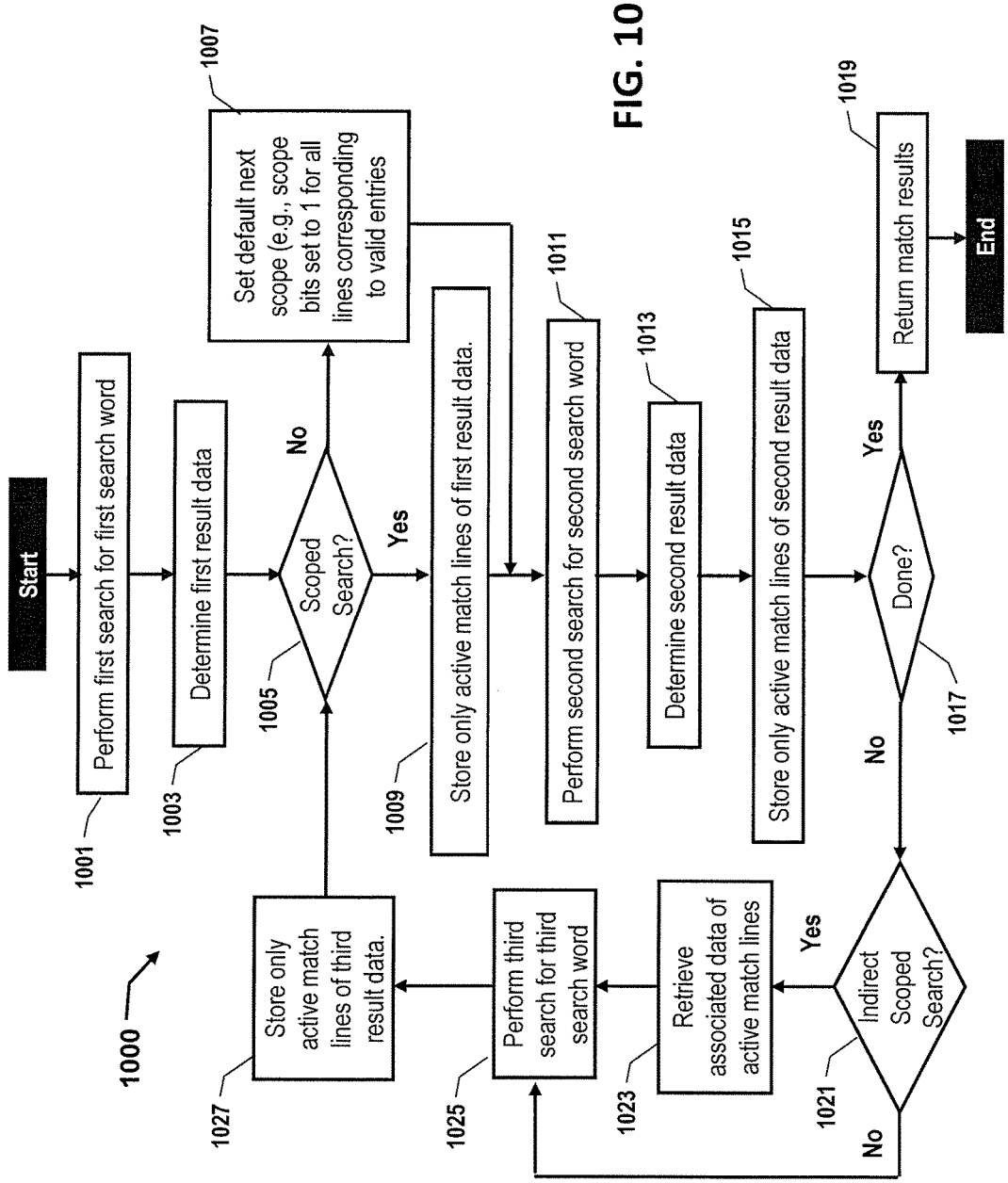
FIG. 10 shows an exemplary process flow for performing scoped searching in accordance with aspects of the present invention.
Figure 11:
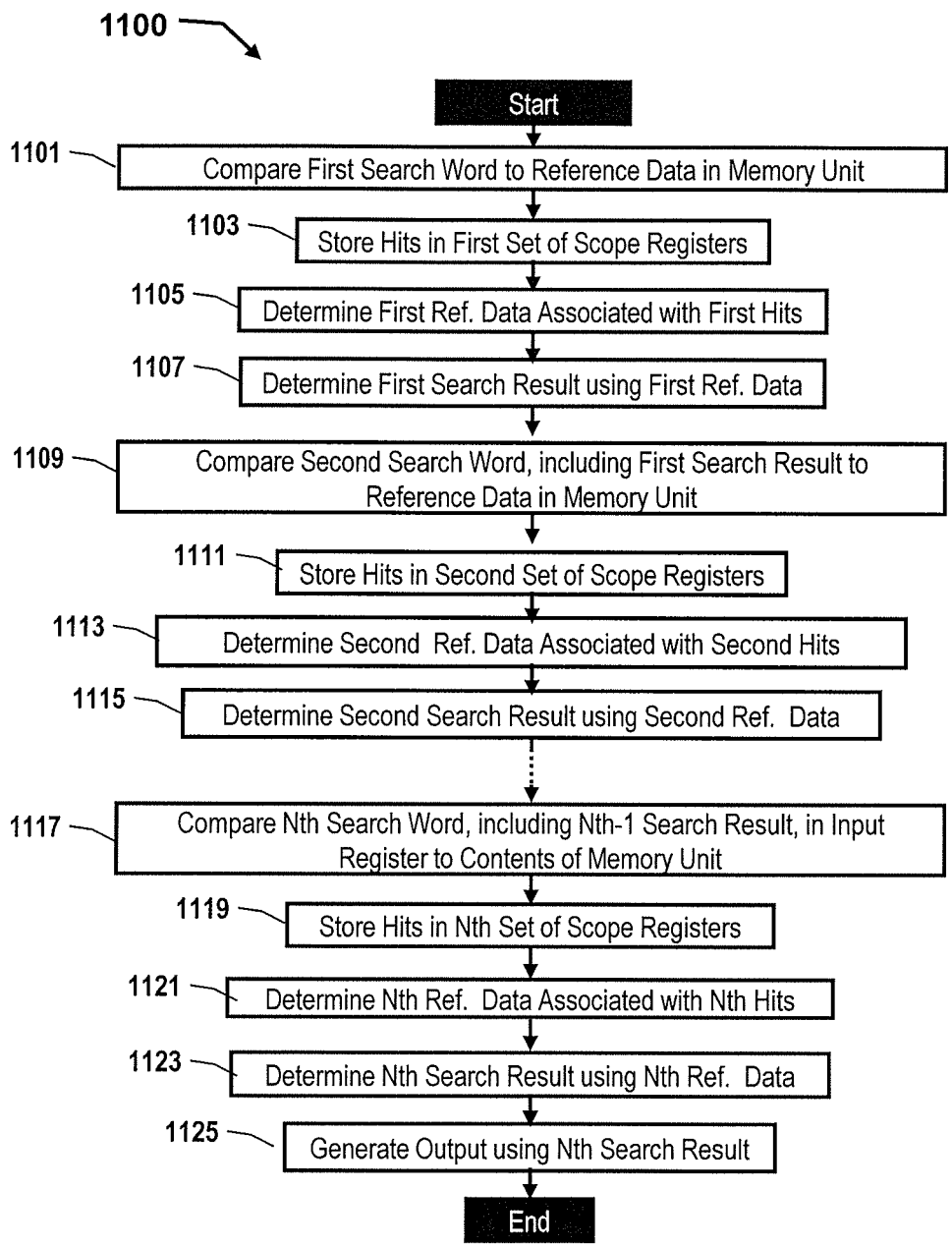
FIG. 11 shows an exemplary process flow for performing scoped searching in accordance with aspects of the present invention.

The flowcharts in FIGS. 10 and 11 illustrate the architecture, functionality, and operation of possible implementations of systems, methods, and computer program products according to various embodiments of the present invention. For example, FIGS. 10 and 11 can illustrate an implementation of program control (e.g. program control 144) and/or search module (e.g., search module 148) in a computing device (e.g., computing device 114) and/or scoped search device 150. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 10 depicts an exemplary flow of a process 1000 for performing scoped searching in accordance with aspects of the invention. In embodiments, control logic (e.g., search module 148) controls a scoped search engine (e.g., scoped search engine 150) to serially stream words of reference data from a memory device (e.g., memory unit 210) and provide it to a data comparison unit (e.g., data comparison unit 230). The data comparison unit performs a parallel comparison of the reference data and search data, and outputs result data indicating any matches (i.e., hits). In accordance with aspects of the invention, the different result data determined by the data comparison unit are scope outputs that can be logically combined by a function processor (e.g., function processor 380) to provide scope result data having a narrower scope.

At step 1001, the control logic controls the scoped search engine to perform a first search for a first search word from a search query in the manner previously described herein. At step 1003, the scoped search engine determines first result data by comparing reference data to the first search word of step 1001. For example, the first search word may identify records in the reference data that include the information "university" and "College X." At step 1005, the logic module determines whether the first result data from step 1003 is to be used in a scoped search. For example, the logic module can determine to perform a scoped search based on the semantics of the search query having a scoped query structure (e.g., GV("Univ," "College X").out ("knows").out ("teaches").has("credits," T.eq.4).Name). If the first result data from step 1003 is not to be used in a scoped search (i.e., step 1005 is "No"), then at step 1007 the logic module sets a default scope and then the process advances to step 1011. For example, the setting default scope can comprise setting every bit of a scope output for the first result data to a high digital logic state. If the first result data generated at step 1003 is to be used in a scoped search (i.e., step 1005 is "Yes"), then the process advances to step 1009. At step 1009, the control logic stores a scope output for the first result data such that only bits corresponding to active match lines (e.g., match lines 340) corresponding to matching reference data have a high digital logic state.

At step 1011, the control logic performs a second search for a second search word from the search query in the manner previously described herein. At step 1013, the control logic controls the scoped search engine to search only the reference data associated with scope outputs from steps 1007 and 1009 that have high digital logic states. The scoped search engine determines second result data by comparing reference data to the second search word. For example, the second search word may identify records in the reference data that include the information "teaches." At step

1015, the scoped search engine outputs second result data of the second search based on the second search data. For example, the second result data may be stored in a second set of the scope registers.

At step 1017, the logic module determines whether or not the search process is complete. The determination may be made based on the semantics of the original search query. If the current search process is complete, then at step 1019, the logic module returns the match results and the process ends. For example, the control logic may display the match results to a user via a computer-user interface (e.g., via I/O interface 124) and/or output the match results to a system (e.g., computing infrastructure 112).

Alternatively, at step 1017, if the control logic determines that search process is not complete, then at step 1021 the control logic determines whether or not the search results from step 1015 are to be used in an indirect scoped search. If the logic module determines the second search results from steps 1015 are not to be used in an indirect scoped search, the process advances to step 1025. At step 1025, the control logic performs a third search for a third search word based on the search results stored in steps 1009 and/or 1015. At step 1027, the control logic selectively stores the third result data identifying the hits determined by the data comparison unit in the scope registers. Then, the process iteratively returns to step 1005.

If the logic module determines the search results generated from steps 1009 and 1015 are to be used in an indirect scoped search, then as step 1023 the logic module retrieves records in the reference data that are associated with the active match lines from the result data determined in steps 1009 and/or step 1015. In embodiments the associated records are identified based on associated memory (e.g., associated data index 870), as previously described herein. The associated data may be stored in the scope registers. Then, at step 1025, the control logic performs a third search for a third search word based on the search results stored in steps 1009 and 1015, and the associated reference data identified in step 1023. At step 1027, the control logic selectively stores the third result data identifying the hits determined by the search in the scope registers. Then, the process iteratively returns to step 1005.

FIG. 11 depicts an exemplary flow of a process 1100 for performing scoped searching in accordance with aspects of the invention. In embodiments, control logic (e.g., search module 148) controls a scoped search engine (e.g., scoped search engine 150) to search reference data in a memory unit (e.g., memory unit 210) and output result data indicating any matches to a data comparison unit (230) as scope outputs in a manner previously described herein. At step 1101, the control logic controls the scoped search engine to perform a first search for a first search word from a search query by comparing the first search word in the manner previously described herein. For example, the search query may request the names of all individuals that know someone at College X. Based on this search query, the first search word may identify any individuals in the reference data that include the information "university" and "College X." For example, the search word may represent to following information: *, university, College X, wherein * is a wildcard.

At step 1103, the control logic controls the search engine to store hits from the search of step 1101 in one or more scope registers (e.g., scope register 375A). For example, any record of reference data in the memory unit including the data "university" and "College X," an active bit is stored in a first set of scope registers. At step 1105, the control logic determines a first set of reference data associated with the first hits stored in the search registers at step 1103. In accordance with aspects of the invention, each hit is associated with the reference data in the memory unit. In embodiments, a memory device (e.g., memory device 377) stores information (e.g., an address or a pointer) corresponding to each bit stored in the scope registers that makes the association between the hits stored in the scope registers and the respective reference data. In other embodiments, the control logic stores a copy of the respective reference data in the memory device. For example, for a particular scope bit corresponding to a hit on the first search word (e.g., "university" and "College X") in the scope registers, the memory device may store one or more addresses (e.g., address location 02) of that reference data. At step 1107, the control logic determines a first search result from the reference data determined at step 1105. For example, the first search result can be an identifier "01" included in the first data. Thus, from steps 1101 to 1107, the search engine determines the first search result (e.g., ID=01) in response to the first search word obtained from the search query. In accordance with aspects of the present invention, the first search result can be used to limit the scope of subsequent searches.

At step 1109, the control logic controls the scoped search engine to perform a second search for a second search word from the search query using the search result data determined at step 1107. For example, the second search word may identify any individuals in the reference data that know the person associated with the identifier "01." Accordingly, the search word may represent to following information: *, knows, 01, wherein * is a wildcard. At step 1111, the control logic controls the search engine to store the hits from the second search of step 1109 in one or more scope registers (e.g., scope registers 375B). For example, for all reference data in the memory unit including data having a name "knows" and a value "01," an active bit is stored in a first set of scope registers.

At step 1113, the control logic controls determines a second set of reference data (e.g., records) associated with the second hits as previously described herein. For example, the memory devices may associate respective addresses with hits from the second search stored in the scope registers. For example, a particular scope bit corresponding to a hit on the search word searched in step 1111 (e.g., "*" "knows" and "01") in the scope registers, the memory device may store one or more addresses (e.g., address locations 08 and 13) of that reference data. At step 1115, the control logic determines a second search result from the reference data from the one or more addresses in step 1113. For example, the second search result can be identifiers "02" and "03" included in the second set of reference data determined at step 1113. Thus, from steps 1109 to 1115, the search engine determines the second search result (e.g., ID's=02 and 03) based on the first search result determined at the step 1107**. In accordance with aspects of the present invention, the second search result can be used to further limit the scope of subsequent searches.

At step 1117, the control logic controls the scoped search engine to perform an Nth search for an Nth search word from the search query using the Nth−1 search result data determined by previous search iteration. For example, a third search word may identify any the names associated with the identifiers determined in step 1115 (i.e., ID's 02 and 03). At step 1117, the control logic controls the search engine to store the hits from the Nth search in one or more scope registers (e.g., scope registers 375C). For example, for any record of reference data in the memory unit including the identifiers "02" or "03" and the name "name" is stored in a third set of scope registers. At step 1119, the control logic determines an Nth set of reference data (e.g., records) determined by the Nth search in step 1117. For example, scope bits corresponding to hits on the search word (e.g., "02" or "03" and "name,") in the scope registers, the memory device may store an address (e.g., address locations 05 and 10) of that reference data.

At step 1121, the control logic determines an Nth search result from the reference data determined at step 1119. For example, a third search result can include the names "Bruce" and "Mary," which are associated with the identifiers "02" and "03." At step 1125, the control logic controls the search engine to output the Nth search result (e.g., Bruce and Mary) identifying individuals that know someone who attends College X.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A scoped search engine comprising:
a memory unit storing reference data records;
a data comparison unit that searches the reference data records using different searches;
a data formatting unit stacked above the data comparison unit and having logic to interface the memory unit with the data comparison unit, the data formatting unit comprising structures to physically route outputs of the memory unit which are not in direct physical alignment with corresponding comparison cells in the data comparison unit; and
a match analysis unit which comprises a function processor and a plurality of scope registers, the match analysis unit combines result data from the different searches and determines a scope of information included in a search query for a subsequent search based on the combined result data, wherein:
the scoped search engine is a stacked, three-dimensional device;
the memory unit is stacked on the data comparison unit and the match analysis unit;
the data comparison unit is stacked on the match analysis unit;
the memory unit is a high-density memory comprising a plurality of stacked memory dies including one or more memory banks; and
the data comparison unit comprises a ternary content-addressable memory device.

2. The scoped search engine of claim 1, wherein the scope for the subsequent search is reduced from respective scopes of the different searches such that a number of reference data records included in the subsequent search is less than in the different searches.

3. The scoped search engine of claim 1, wherein the scope for the subsequent search includes a plurality of the reference data records retrieved from the memory unit based on their association with the result data from the different searches.

4. The scoped search engine of claim 1, wherein the data comparison unit comprises a content-addressable memory device.

5. The scoped search engine of claim 1, further comprising a counter that determines respective counts of reference data records in the result data from the different searches that match search data of the different searches, and that stores the respective counts in association with the result data from the different searches.

6. The scoped search engine of claim 5, wherein the match analysis unit combines the result data from the different searches in a prioritized order based on the respective counts stored in association with the result data from the different searches.

7. The scoped search engine of claim 1, further comprising a plurality of scope registers that respectively store the result data of each of the different searches.

8. The scoped search engine of claim 7, wherein the plurality of scope registers are sticky latches that retain the result data from the different searches.

9. The scoped search engine of claim 7, wherein the match analysis unit selectively stores the result data from the different searches in the plurality of scope registers.

10. A scoped search engine comprising:
a memory unit storing reference data records;
a data comparison unit that searches the reference data records using different searches;
a data formatting unit stacked above the data comparison unit and having logic to interface the memory unit with the data comparison unit, the data formatting unit comprising structures and the logic to physically route outputs of the memory unit which are not in direct physical alignment with corresponding comparison cells in the data comparison unit; and
a match analysis unit comprising a function processor and a plurality of scope registers that combines result data from the different searches and determines a scope of information included in a search query for a subsequent search based on the combined result data,
wherein:
the scoped search engine is a stacked, three-dimensional device;
the memory unit is stacked on the data comparison unit and the match analysis unit;
the data comparison unit is stacked on the match analysis unit;
the memory unit is a high-density memory comprising a plurality of stacked memory dies including one or more memory banks; and
the data comparison unit comprises a ternary content-addressable memory device.

11. The scoped search engine of claim 10, wherein the high-density memory streams the reference data to the ternary content-addressable memory device via a plurality of parallel vertical interconnects.

12. The scoped search engine of claim 11, wherein the one or more memory banks of the memory unit time-share comparison cells of the ternary content-addressable memory device in the data comparison unit.

13. The scoped search engine of claim 12, wherein the one or more memory banks are a stack of DRAM banks formed using several identical memory dies.

14. The scoped search engine of claim 13, wherein the data formatting unit aggregates the reference data records provided from the memory unit and remaps the reference data records into a format for the data comparison unit.

15. The scoped search engine of claim 14, wherein the data formatting unit includes parallel interconnects which make electrical connections between outputs of the memory banks in the memory unit and the comparison cells in the data comparison unit.

16. The scoped search engine of claim 15, wherein the parallel interconnects of the data formatting unit physically route outputs of the memory unit that are not in direct physical alignment with the comparison cells in the data comparison unit.

17. The scoped search engine of claim 16, wherein the memory unit connects to the data formatting unit at the locations vertically corresponding to output pins of the DRAM banks of the memory unit.

18. A scoped search engine comprising:
   a memory stack comprising memory dies including a plurality of memory banks storing reference data;
   a data comparison die comprising a plurality of search lines, a plurality of match lines and an array of comparison cells;
   a data formatting die for interfacing the memory stack and the data comparison die, the data formatting die comprising structures and logic to physically route outputs of the memory stack which are not in direct physical alignment with corresponding comparison cells in the data comparison die; and
   a match analysis die comprising a function processor and a plurality of scope registers that store result data from the data comparison die,
   wherein:
      the comparison cells comprise an array of vertical interconnects electrically connected to respective outputs of the memory stack that stream the reference data;
      the plurality of search lines connect the comparison cells in columns to an input register that stores a search word;
      the plurality of match lines connect the comparison cells in rows to the scope registers; and
      the function processor selectively combines the result data stored in the plurality of scope registers based on a search query.

19. The scoped search engine of claim 18, wherein the data comparison die comprises a ternary content-addressable memory device.

20. The scoped search engine of claim 18, wherein:
   the memory stack stores a database having a property graph structure in which the reference data comprised of vertices and edges; and
   the memory stack stores an associated data index associating each of the vertices with another one of the vertices via a common one of the edges.

* * * * *